(12) United States Patent
Lingnau (10) Patent No.: US 10,926,350 B2
(45) Date of Patent: Feb. 23, 2021

(54) INTEGRATED HEAT TREATMENT APPARATUS AND METHOD FOR AUTOGENOUS WELDING

(71) Applicant: David Grant Lingnau, Calgary (CA)

(72) Inventor: David Grant Lingnau, Calgary (CA)

(73) Assignee: Spinduction Weld, Inc., Calgary (CA)

( * ) Notice: Subject to any disclaimer, the term of this patent is extended or adjusted under 35 U.S.C. 154(b) by 204 days.

(21) Appl. No.: 16/048,215

(22) Filed: Jul. 27, 2018

(65) Prior Publication Data

US 2019/0030638 A1 Jan. 31, 2019

Related U.S. Application Data

(60) Provisional application No. 62/538,011, filed on Jul. 28, 2017.

(51) Int. Cl.
*B23K 13/01* (2006.01)
*B23K 13/02* (2006.01)
*F16L 13/02* (2006.01)
*B23K 20/12* (2006.01)

(52) U.S. Cl.
CPC .......... *B23K 13/015* (2013.01); *B23K 20/129* (2013.01); *F16L 13/02* (2013.01)

(58) Field of Classification Search
CPC .... B23K 20/129; B23K 13/015; B23K 20/12; F16L 13/02

USPC ..... 219/607, 617, 632, 121.64, 121.63, 162, 219/643, 659, 137 R, 60 R, 61, 61.2; 228/168, 218, 219, 225, 169, 196, 227, 228/256

See application file for complete search history.

(56) References Cited

U.S. PATENT DOCUMENTS

| | | | | |
|---|---|---|---|---|
| 4,734,552 A | * | 3/1988 | Brolin | B23K 13/02 219/617 |
| 6,637,642 B1 | | 10/2003 | Lingnau | |
| 6,825,450 B2 | * | 11/2004 | Ribeiro | F02F 3/003 219/617 |
| 8,998,067 B2 | | 4/2015 | Lehr | |

* cited by examiner

*Primary Examiner* — Quang T Van
(74) *Attorney, Agent, or Firm* — Amburn Law PLLC; Dean W. Amburn (57) ABSTRACT

The present invention relates to an improved process and embodiments for girth welding of metal tubes and pipes and other shapes based on existing high speed, one-shot welding processes which have been modified to integrate a rapid heat treatment instantly after the weld is completed, while the weld is still hot and above specified transformation temperatures. The principle advantages are improved mechanical properties in the weld with a reduced cycle time to achieve them versus conventional separate post weld heat treatments such as tempering or quenching and tempering.

20 Claims, 9 Drawing Sheets

Typical Austempering Heat Treatment Plotted on TTT Diagram of Hypoeutectoid Steel

FIG. 5

Typical Thermal Cycle of Standard Induction Kinetic Weld

FIG. 6

Combined Cycle of Induction Kinetic Weld with Integrated Heat Treatment

FIG. 7

Typical Marquenching Heat Treatment Plotted on TTT Diagram of Hypoeutectoid Steel

INTEGRATED HEAT TREATMENT APPARATUS AND METHOD FOR AUTOGENOUS WELDING

RELATED APPLICATIONS

This application claims priority to and the benefit of U.S. Provisional Patent Application No. 62/538,011, filed on Jul. 28, 2017, the entire contents of which are hereby incorporated by reference.

TECHNICAL FIELD

The present invention generally relates to enhancing the microstructure and physical performance of rapid, solid state welds of metals and alloys. It more specifically relates to a welding process through the integration of ThermoMechanical Controlled Processing ("TMCP") during or after the kinetic phase of the conventional Induction Kinetic Weld ("IKW") process and/or Integrated Heat Treatment ("IHT") of the IKW weld instantly after the weld has been formed.

BACKGROUND

A good example of highly optimized manufacture of a basic shape is the pipe used for pipelines. Starting with the chemistry, it is carefully controlled to ensure the end product is high purity and readily weldable by arc welding processes. For example, by keeping the carbon content below 0.2% and the carbon equivalent below 0.4%, the weldability is improved, so required strengthening is achieved by other methods such as microalloying with niobium, vanadium, etc., or by TMCP forming processes in shaping the final product. Especially in the case of elongated products like pipe, there is both a motivation and an inherent tendency to develop isotropic properties in the structure where, for example the longitudinal toughness is greater than the transverse toughness. This is beneficial for end uses such as pipelines where it is generally more important to achieve greatest strength and toughness parallel to the longitudinal axis as opposed to the through-thickness axis. Directionally tuned properties like these are manageable when conventional arc welding is used to join pieces together because the filler metals used can readily be overmatched in their composition using expensive alloying elements in higher concentrations to help compensate for any loss of strength in the immediately adjacent parent metal. Over the past half century, the chemistry and performance of pipeline steels and filler metals have evolved together to deliver very high properties in terms of yield strength and impact toughness. Even so, there are several intrinsic disadvantages with arc welding methods which cannot be eliminated. All arc welding processes involve melting of the parent metal, therefore a whole family of phase change related weld defects are possible and probable, such as porosity, inclusions, undercut, solidification cracking, etc. Also, all commercially practical arc welding processes are incremental, multi pass processes which are slow, labor intensive and much more prone to defects than solid state processes. Recently there has been increasing interest in fully automated high-speed welding processes and particularly solid-state welding processes which do not involve any filler metal, technically classified as "autogenous" welding. Much research and pre-commercial development work has been done in the past decade to optimize several solid-state welding processes for critical applications and capture the many economic and technical advantages offered by these processes. One area where these autogenous welding processes have room for improvement is increasing the bond zone properties to more closely match the isotropically enhanced levels of the parent metal. It may never be possible to fully match the longitudinal properties of these directionally optimized products, but improvement is desirable and achievable.

SUMMARY

The present invention enhances the microstructure and physical performance of rapid, solid state welds of metals and alloys used in a wide range of industries, for example, aerospace, automotive, mining, nuclear, oil & gas, pipelines, etc. In these industries, there is increasing use of high performance alloys, mainly steels but also including titanium alloys or nickel-based alloys, which have been manufactured in basic shapes such as tubes, which often must be welded together or to other pieces. Carefully optimized manufacturing processes for these basic forms to achieve the highest possible performance are nearly always degraded by welding processes. It is the purpose of this invention to provide a way to reduce or eliminate that degradation from the welding process through the integration of thermomechanical controlled processing ("TMCP") and/or Integrated Heat Treatment ("IHT") of the IKW weld while the weld is being formed or instantly after the weld has been formed.

It is the primary objective and advantage of this invention to improve the bond zone properties of welds using the rapid solid-state welding method preferred in this invention, previously taught in U.S. Pat. No. 6,637,642, titled Method of Solid State Welding and Welding Parts, and incorporated herein by reference as if repeated word for word, but also any similar, compatible welding processes. Said preferred process utilizes induction heating of the pipe ends in a non-reactive atmosphere, quickly raising the end faces up to the hot working temperature, which then are kinetically welded in rapid motion cycle of a few seconds duration, joining the entire weld cross section all in unison. This will henceforth be referred to as the Induction-Kinetic Welding or "IKW" process and will serve as an example application of the present invention.

While there are many potential variations in the possible methods and applications of the present invention, the primary focus will be on those affording the greatest simplicity, speed, practicality and commercial benefit. For example, the preferred process of IKW enables the integration of not only thermal processing but also facilitates kinetic energy input during the post weld processing; in other words, thermal and mechanical processing ("TMCP") as a contiguous part of the welding cycle. However, this disclosure will focus purely thermal processes integrated with the IKW welding process which hereafter will be referred to as Integrated Heat Treatment "IHT" process. And although the potential applications are found in many industries, e.g. automotive, aerospace, oil & gas, mining, nuclear, etc., this disclosure will focus on pipeline related applications. Several different post weld heat treatments such as Austempering, Isothermal Annealing, Marquenching (Martempering) and Patenting heat treatment are all possible and compatible with the present invention, however this disclosure will focus mainly on Austempering since it provides the most important benefits to pipeline type applications.

Whereas the IKW welding process delivers high quality, high speed welds, it has certain limitations with respect to engineering properties which in turn are dictated by the metallurgical microstructures typically delivered by the simple intrinsic thermal cycle of the IKW process. In the IKW process, the parts are induction heated typically for about 10 seconds and then subjected to additional kinetically driven viscoplastic heating for an additional 1 to 2 seconds, typically. During the kinetic phase of the IKW cycle, a very important metallurgical process called Dynamic Recrystallization ("DRX") occurs, which is the main distinction and advantage of welds made using the IKW process. Since the resulting weld is a comparatively slender, planar hot zone between adjoining cold parent metal masses, the resulting conduction cooling of the weld is typically rapid, though not quite as severe as a comparable friction weld or inertia weld. This cooling mode is known as auto quenching since no coolant or quench media (e.g. oil, brine, polymer, etc.) is involved. The purpose of the present invention is to improve the final microstructure by integrating additional thermal and/or thermomechanical inputs to the weld zone before it has a chance to auto quench due to the attached parent metal. This means there are only a few seconds to catch the weld while it is still above critical transformation temperatures. Therefore, the equipment performing the IHT process or TMCP process must be built into the welding chamber of the IKW process. In general terms both processes will utilize the same additional physical components to a standard IKW machine, but the choice of whether or not to include kinetic inputs after the standard IKW weld is determined by the steel chemistry and the service requirements of the intended application. In a properly modified IKW machine, the choice between IHT process and TMCP would simply be a menu selection by the machine operator.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION

Figure 1:
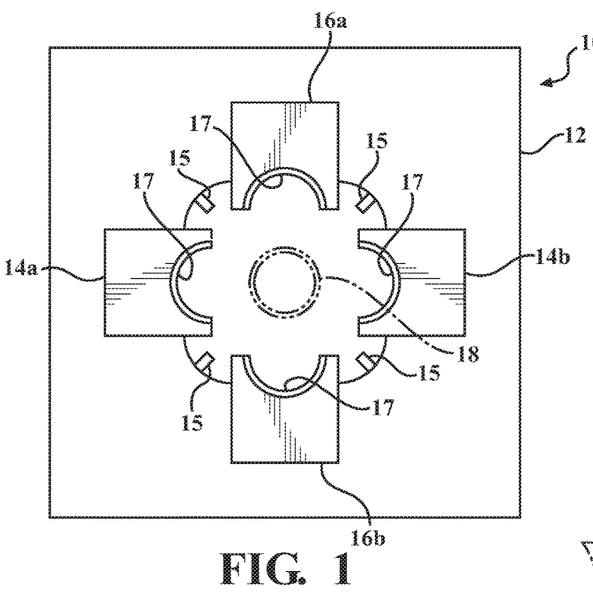
FIG. 1 is a schematic-type drawing of a non-limiting embodiment of the apparatus of the invention.
Figure 2A:
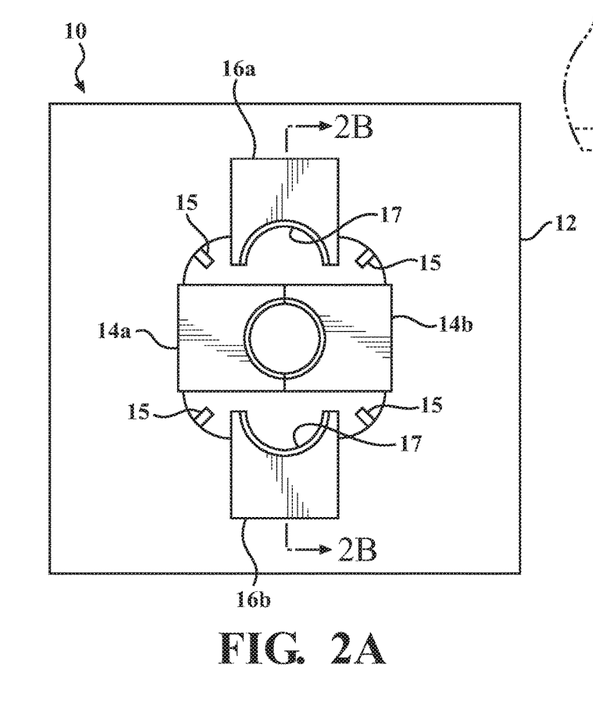
FIG. 2A is schematic-type drawing of a variation of the invention of FIG. 1.
Figure 2B:
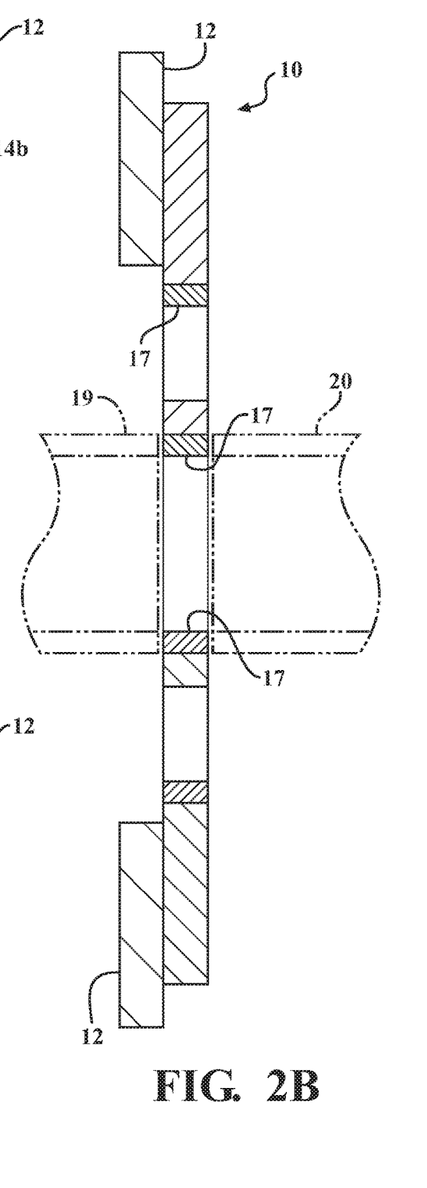
FIG. 2B is a partial side cross-sectional view of FIG. 2A.
Figure 3A:
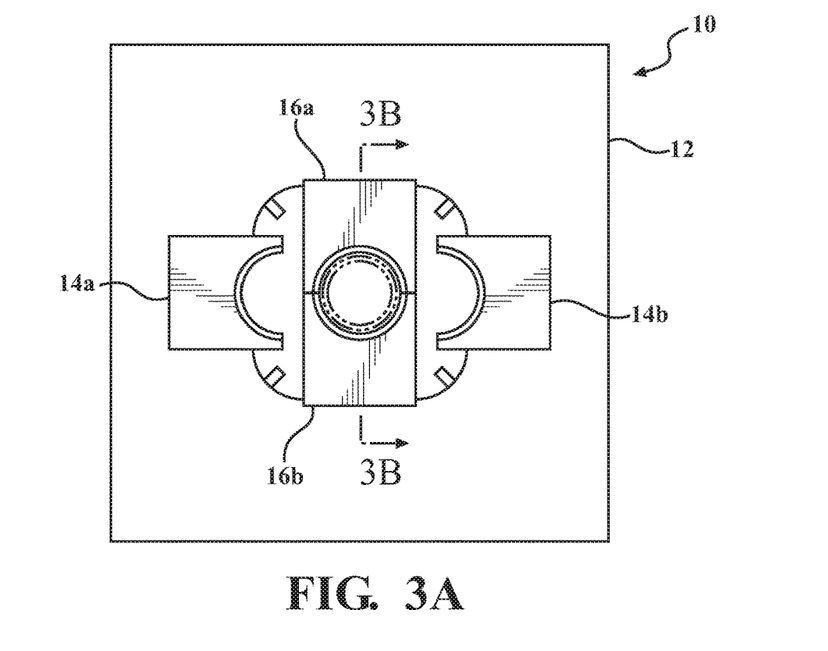
FIG. 3A is a schematic-type drawing of a variation of the invention of FIG. 1.
Figure 3B:
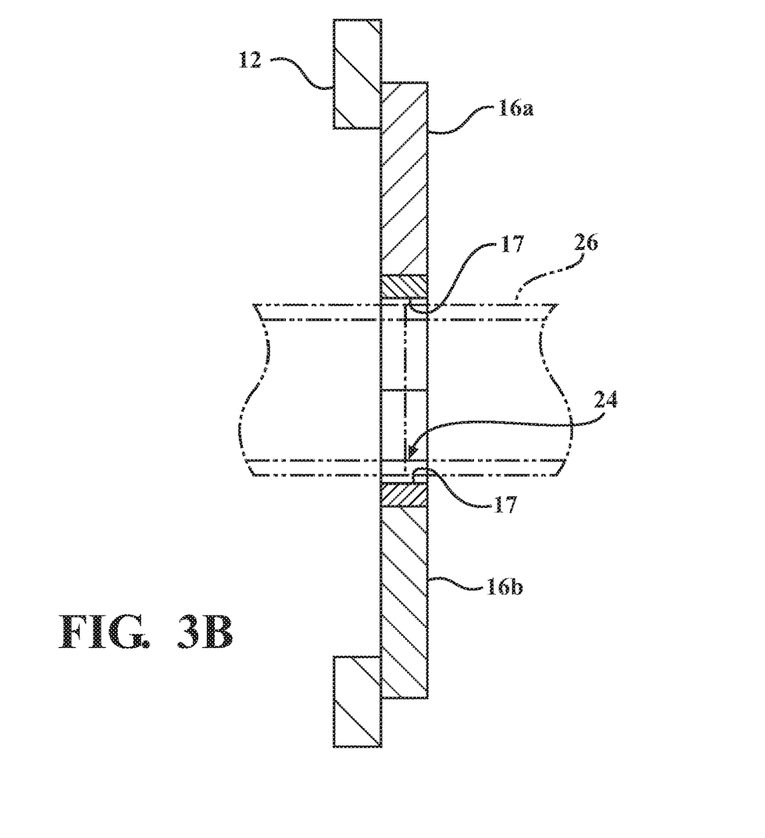
FIG. 3B is a partial side cross-sectional view of FIG. 3A.
Figure 4:
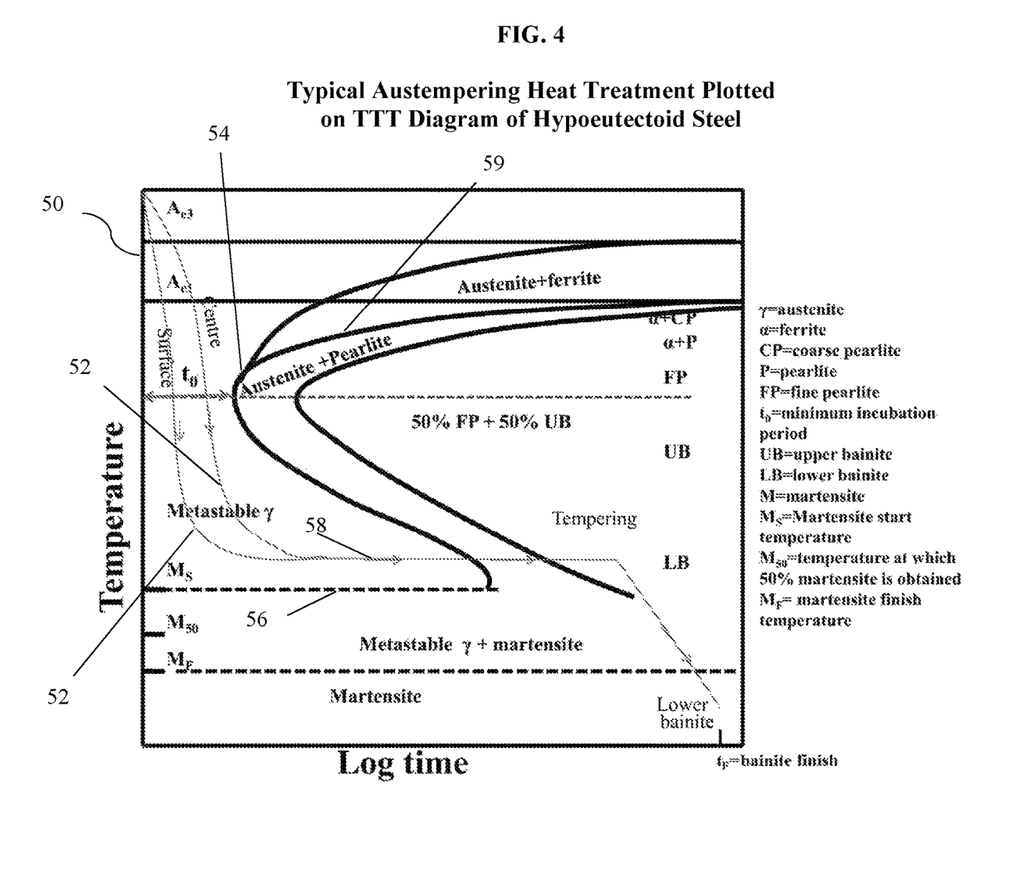
FIG. 4 is a plot of an austempering heat treatment plotted on TTT diagram of hypoeutectoid steel.

Referring generally to FIGS. 1-9 of the drawings, and more particularly FIGS. 1-4, a non-limiting embodiment of the apparatus of the invention 10 for an IKW process with an IHT method includes a welding chamber 12 (schematically seen in FIGS. 1-3 and as known to those skilled in the art, e.g. see FIG. 4 of U.S. Pat. No. 6,637,642) and IKW coil members 14a and 14b along with IHT coil members 16a and 16b. IKW coil members 14a, 14b and IHT coil members 16a and 16b include copper induction coil portions 17 which are generally "C" shaped. With particular reference to FIGS. 2A and 2B, a first pipe 18 and second pipe 20 (seen in broken line as part of the environment of the invention) having pipe endfaces 22 are held proximate to each other in preparation for an IKW welding process by chucks (not shown). During the IKW welding process IKW coil members 14a and 14b move together along a horizontal axis until they meet to form a closed circuit of an IKW induction coil 18. The inside diameter of the IKW induction coil 18 is approximately the same as the inside diameter of the first pipe 18 and the second pipe 20.

With reference to FIGS. 3A and 3B, after the endfaces of the first pipe 19 and the second pipe 20 are welded together as part of the IKW process, IHT coil members 16a and 16b move together along a vertical axis until they meet to form a closed circuit of the IHT induction coil 21 in close proximity to a weld 24 of a welded pipe 26. The inside diameter of the IHT induction coil 21 is greater than the outside diameter of the welded pipe 26. An IHT process can then be performed on the welded pipe 26, as described in more detail below, and including benefits such as austempering.

Austempering is advantageous to achieving a strong weld since the resulting microstructure of lower bainite is regarded by many metallurgists as having the highest level of toughness combined with strength achievable in engineering steels and alloys. When a steel with purposely selected chemistry is processed by austempering, it becomes possible to achieve the lower bainite microstructure in a reasonably short cycle time and in useful wall thicknesses. For example, boron is a key alloying element enabling the austempering process to deliver this microstructure on greater wall thickness steel.

Referring to FIG. 4, Austempering is a two-step process starting with the steel in the austenitic state 50 above $A_{e3}$ which for hypoeutectoid steels typically is above 750° C. as seen in the upper left corner. From here, the steel is rapidly quenched along the quenching lines 52 to just above $M_s$ (56) which is the martensite start temperature. Crucially the quenching must be fast enough to happen entirely to the left of the nose of the TTT curve 54. Once cooled down to a controllable margin over $M_s$ (56) the steel is held at this temperature following the horizontal quenching line 58 for a duration ranging from minutes to hours, depending upon the chemistry of the steel. At this constant temperature (typically between 260° C. to 400° C.) the austenite remains in a metastable state until the heavy black line 59 of the Austenite+Pearlite boundary is encountered, and that transformation commences. Provided the temperature is maintained above $M_s$ (56) the microstructure will ultimately transform into lower bainite. Once that has finished, the steel can be cooled to room temperature at a wide range of cooling rates.

Figure 5:
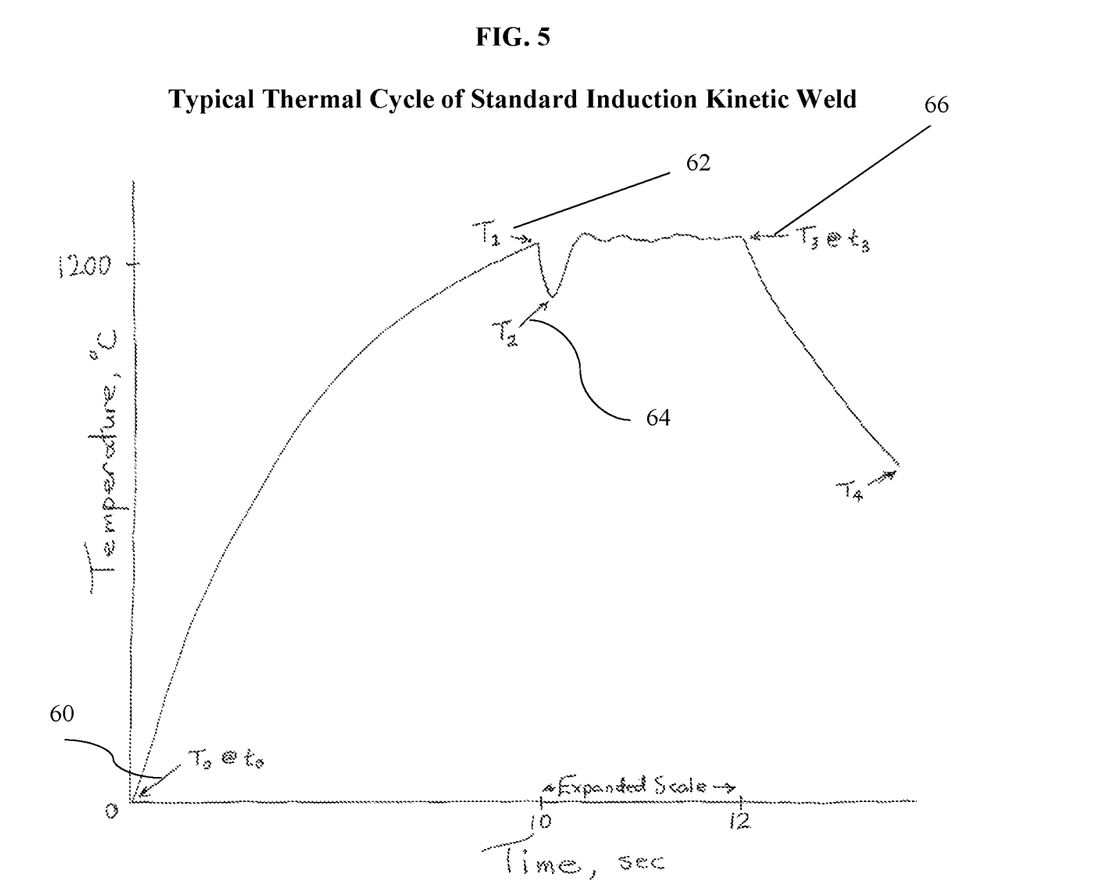
FIG. 5 is a plot of a thermal cycle of an Induction Kinetic Weld.

As the name denotes, the Induction Kinetic Weld process of FIG. 5 begins with induction heating of the pipe ends, typically for a duration of about 10 seconds starting from $T_0$ at $t_0$ (60). This is normally achieved by an induction coil located between the pipe ends with a small air gap of a few millimeters separating each face of the induction coil from the adjacent pipe end. The induction heating is performed at a frequency generally in the range of 2 kHz to 20 kHz so that the skin effect confines the heat penetration to the desired depth, typically 2 mm to 8 mm. In this disclosure, this range of 2,000 Hz to 20,000 Hz will be termed as the "high frequency", in comparison to the induction frequency which is recommended for the subsequent Integrated Heat Treatment, which will generally be done at anywhere from 2,000 Hz down to 50 Hz. This low frequency for the IHT is desirable because it is more effective for heating the through the whole pipe wall thickness.

Once the endface of each pipe reaches the desired hot working temperature $T_1$, (62) typically in the range of 1,100° C. to 1,300° C., then the induction coil is rapidly retracted from between the hot pipe ends and the pipes are rapidly brought into contact, thus commencing the kinetic phase of the IKW process. During the coil retraction interval, the temperature of the pipe ends typically drops by about 100° C. denoted by $T_2$ (64). At this instant, the kinetic phase starts to increase the temperature back into the hot forging range and continues doing so typically for 1 to 2 seconds total, during which the temperature of the weld zone hovers around 1,200° C. denoted by $T_3$ (66). Under these conditions of relatively constant temperature maintained by kinetic energy input, the viscoplastic flow produces dynamic recrystallization (DRX) entirely in the austenitic state. This helps refine the grain size and blend the formerly distinct edges along the ID and OD of the pipe ends into one homogeneous microstructure with a smooth, discontinuity-free macrostructure. As soon as the kinetic input is halted at $t_3$ (66), the weld zone cools very rapidly due to the adjoining cold parent metal. For high strength hypoeutectoid steels, this usually will be a sufficiently rapid quench rate to form untempered martensite which in pipeline applications is unacceptably hard and brittle. Therefore, a post weld heat treatment of at least tempering the weld is required. For lower strength pipeline steels with low carbon equivalents, it certainly is possible to tune the IKW parameters to produce welds which do not exceed Vicker hardness 248 in the as welded condition. However, these steels are being superseded by higher strength formulations, with a strong motivation to avoid separate post weld heat treatments.

Figure 6:
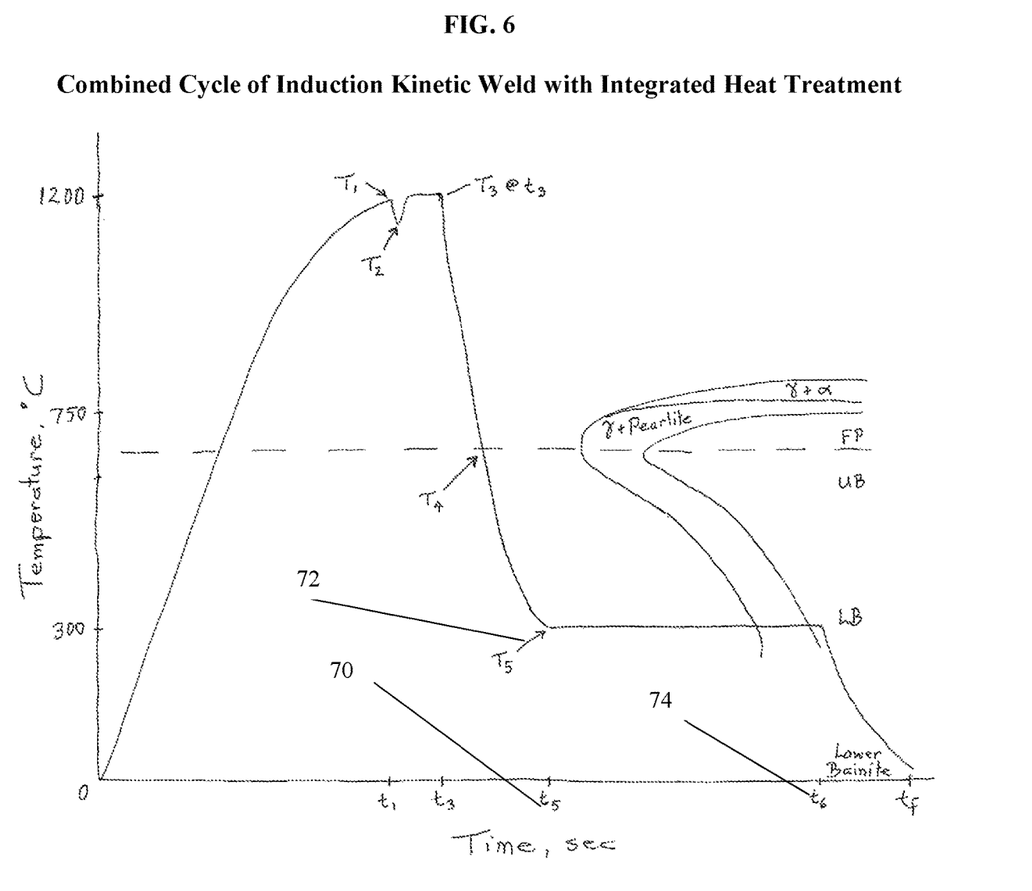
FIG. 6 is a plot of a combined cycle of Induction Kinetic Weld with Integrated Heat Treatment.

When standard IKW is combined with Integrated Heat Treatment, the resulting thermal cycle is shown in FIG. 6. To the left of $t_5$ (70), the timescale is linear, representing a typical IKW weld cycle. But to the right of $t_5$ (70), the timescale is logarithmic, representing a conjoined austempering process cycle which catches the autoquench temperature drop of a typical IKW weld before the steel in the weld zone falls below the martensite start temperature. This is accomplished by extending two opposing "C" shaped induction coils (as described above in relation to FIGS. 1-3) which encircle the pipe at the weld zone while the kinetic phase of the IKW cycle is happening. While this quenching provision may not be necessary for austempering, it generally is required for marquenching. As soon as the autoquench temperature falls to $T_5$ (72), the externally encircling pair of C-shaped induction coils are energized at a power level which maintains the temperature at $T_5$ until transformation of the metastable austenite into lower bainite is complete at $t_6$ (74). Contained within the mating C-shaped coils is provision for injecting and circulating a quench media, so that starting at $t_6$, the weld and adjacent parent metal can be quickly cooled down to safe handling temperature for workers and subsequent processes such as ultrasonic inspection.

Figure 7:
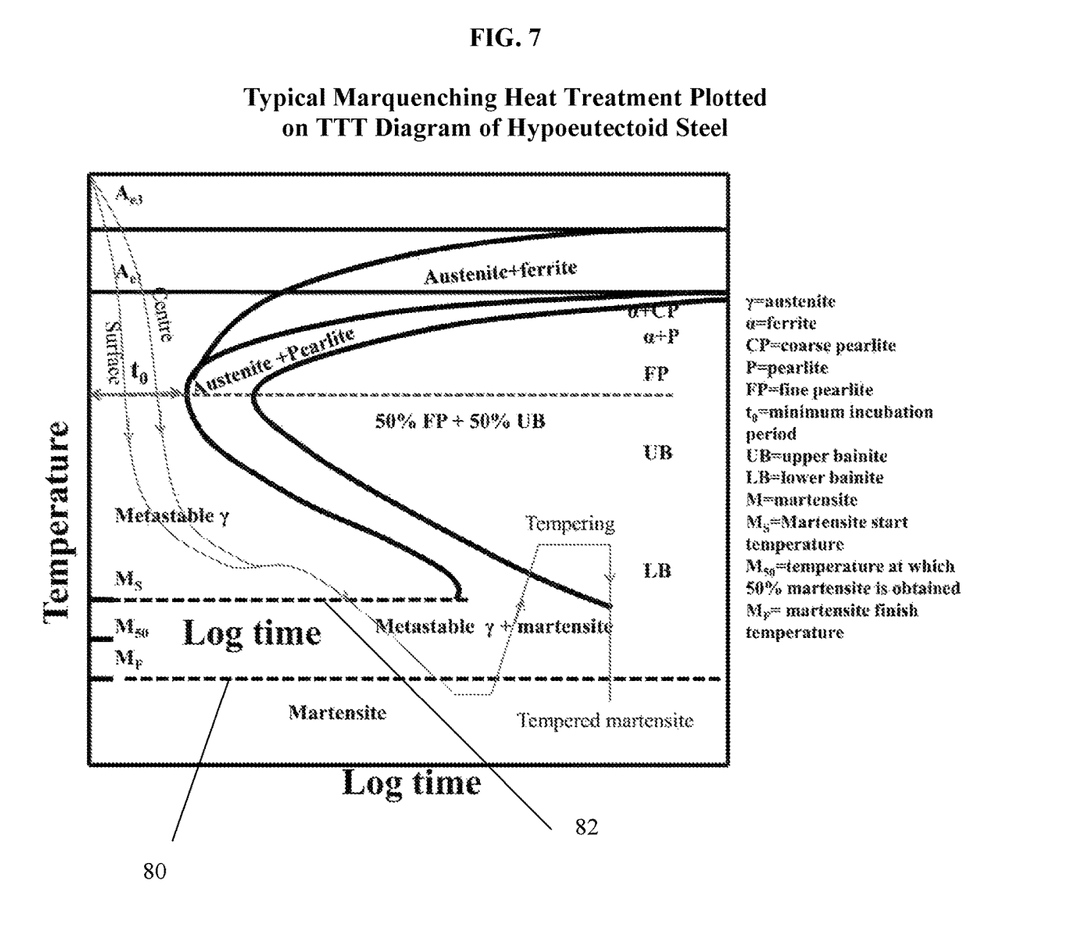
FIG. 7 is a plot of a marquenching heat treatment plotted on TTT diagram of hypoeutectoid steel.

Once an IKW machine has been equipped for the combined cycle of IKW plus IHT as described above, it then is capable of a variety of potential integrated heat treatments. FIG. 7 shows the typical temperature path for the marquenching process which could be achieved in a combined cycle analogous to what is described in relation to FIG. 6, but with the two additional thermal steps necessary to perform the process as defined. In this variation of the present invention, it certainly will be necessary to reheat the weld zone from below $M_F$ (80) back to above $M_s$ (82) and also generally will be necessary to quench down from the final tempering temperature to produce the desired tempered martensite as the final microstructure in the weld.

As an overall statement on all possible machine configurations to accomplish a IKW and, it is evident that there is no single one which is best for all applications. Rather, the best embodiment of this invention will be specific to each application and will depend upon the metallurgical transformation characteristics of the steel being welded, together with the desired heat treatment, as well as the size and wall thickness of the welds. Described below is the configuration which provides versatility to achieve a wide range of different heat treatments for the large pipe sizes, working with the wide range of steel chemistries. A representative real-world application for this configuration would be offshore pipeline construction.

As described above in relation to FIGS. 1-3, a IKW machine arrangement of two chucks (not shown) each clamping a pipe with the induction coil extended between the pipes when in the heating position. Once the hot forging temperature is reached, the induction coil quickly retracts so that the pipe ends can be brought into contact with each other while they are still in the range of the hot forging temperature, denoted as $T_2$ (64) on FIG. 5. At this instant, the main kinetic energy input begins, usually in the mode of rotational motion of one of the pipes while the opposing pipe is held stationary. The cooling seen from $T_1$ to $T_2$ is due to the time required to extract the induction coil from between the opposing pipe ends, typically a duration of up to half of a second. Inside of the typical IKW welding chamber, the induction coil travels in a simple linear path with a travel length of at least one pipe diameter if the coil is a single piece.

As described above in relation to FIGS. 1-3, it is also possible to design this high frequency coil as two separate C-shaped half coils which come in from diametrically opposite sides of the pipe as they extend into the gap between the pipe ends. This has several advantages:

a) It allows for the use of tooling and machinery inside of the pipes to control the purge environment, and/or align the pipe ends before clamping, and/or create a quenching cavity on the ID of the pipe.

b) It reduces the time required for the coil to be retracted and thus reduce the amount of cooling from $T_1$ to $T_2$ described above. This becomes especially important for large diameter pipes where the time for a single piece coil to traverse over one pipe diameter allows too much cooling before the kinetic phase can begin.

c) It allows the purge gas confinement around the OD of the pipe to be integrated with the two halves of the induction coil, provided that the purge confinement is retracted after a slight delay from when the coil halves are retracted. Purge confinement must be maintained in position at least until the moment of hot contact of the heated pipe ends, but ideally should be slightly after this, in other words, slightly after time $t_2$ on FIG. 6.

In reference to FIGS. 1-3, the welding chamber 12 (schematically seen in FIGS. 1-3 and as known to those skilled in the art, e.g. see FIG. 4 of U.S. Pat. No. 6,637,642) can be lengthened, so that the chucks are positioned further apart such that the pipe ends project from each chuck by approximately half of the pipe diameter. This creates the necessary space to install the low frequency heat treating C-shaped coils which have an ID slightly larger than the OD of the intended weld. As described the high frequency induction coil for the modified IKW machine would be two opposing "C" shaped half coils which come in from diametrically opposite sides of the pipe as they extend into the gap between the pipe ends and touch together in the middle. Generally, it would be desirable to integrate a purge gas confinement as the two "C" shaped half shells linked to the IKW induction coils, but with a motion delay mechanism to permit the purge gas confinement to linger in operating position slightly after the IKW coils have fully retracted. These IKW coils and purge containment components occupy one of the two available cross axis motion paths between the two chucks. For example, the high frequency IKW coils could extend/retract along a horizontal path, perpendicular to the longitudinal axis of the pipes which would also be horizontal. In this case, the low frequency IHT coils would extend/retract along a vertical path, perpendicular to both the pipe axis and the IKW coil path. Close synchronization of the two pairs of "C" shaped coils is required to minimize the time when neither are in operating position to deliver induction heating into the weld, yet avoid collisions. In the vast majority of IKW pipe welds, there would be a full one-second to retract the IKW coil pair and another full one-second to extend the IHT coil pair with plenty of time to spare before temperature $T_5$ (72) at $t_5$ (70) on FIG. 6 occurs due to autoquenching. It is crucial to maintain the purge gas environment until after hot contact at $t_2$ on FIG. 6 to ensure oxidation does not happen on the heated endface before the pipe ends are in intimate contact for their entire circumference. For some steel compositions, this condition is not satisfied until halfway or more through the kinetic phase of the IKW.

In scenarios where there is insufficient time to sequentially move the two coil pairs without collision before $T_5$ at $t_5$ occurs, there is a simple solution. A static purge confinement chamber fully enveloping both pairs of coils solves the problem by allowing the IHT coils to extend as soon as the IKW coils are fully retracted before time $t_2$ on FIG. 6, without waiting until the hot pipe ends are in intimate contact for their entire circumference.

Another modification of the standard IKW system, which further enhances the benefits of IHT and/or TMCP is to provide an internal Multi-Function Tool ("MFT"), which fits inside the ID of the pipe being welded. In general description is comprised of two close coupled internal packers which bridge between the opposing pipe ends and seal off the internal cross section of both pipes where they come together to achieve any or all of the following functions:

a) Assure accurately mating pipe ends in a final touch up field machining operation immediately before the pipes are loaded into the IKW machine for welding.

b) Help align the pipe ends before they are clamped in the IKW chucks.

c) Control the purge environment inside of the pipes to minimize the consumption of purge gas.

d) Create a quenching cavity on the ID of the pipe so that any required quenching can occur simultaneously on the OD and ID surface of the tubular weld.

e) Provide induction heating from the inside of the pipes at any time after to on FIG. 6 to enhance either or both the IKW process and the IHT process.

Not all of the functions can be built into an internal MFT for small diameter pipes (e.g. 100 mm ID). However, for large diameter pipes, especially those with heavy wall thickness of 20 mm or greater it is both possible and desirable for a tool to provide all five functions.

Figure 8:
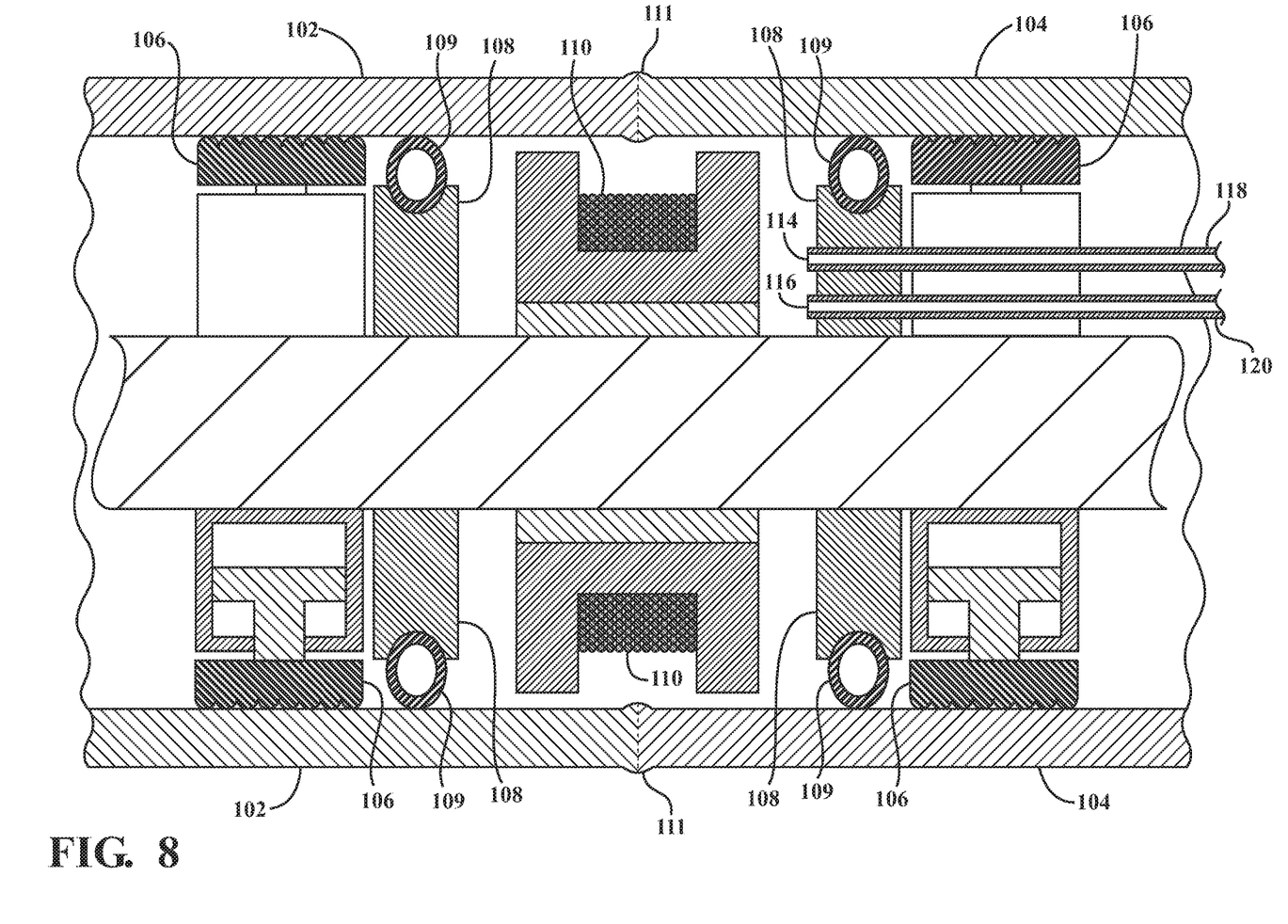
FIG. 8 is cross-sectional view of a non-limiting embodiment of the apparatus of the invention.

FIG. 8 shows such a tool 100 according to the invention which in its first function, rigidly grips both first 102 and second 104 pipes by means of twin pairs of internal, self-centering wedge blocks 106 spaced sufficiently far apart (typically 2 diameters) to achieve the required rigidity for optionally holding the pipes steady with respect to each other during a touch-up machining operation which simultaneously skims the endface of both pipes. The wedge blocks 106 remain rigidly locked while rolling the pipes along a firing line feeding into the improved IKW machine and especially during the clamping operation once the pipe ends are inside the IKW welding chamber (not shown), centered between the two chucks (not shown). Once both IKW chucks are fully clamped, one pair of wedge blocks 106 can be released to allow for the impending axial and rotary relative motion of the pipes during the kinetic phase of the IKW process.

Between the close coupled packer bodies is a pair of purge baffles 108 with a cross section which resembles the inner half of a simple toroid. In other words, the cross section would have a "D" shaped profile with the straight side of the D coinciding with the ID of the pipe and achieving an appropriate seal against that surface at a location at least 30 mm back from each pipe end. This seal serves two purposes: i) to prevent oxygen ingress during the IKW process from the distal volume of air inside the pipes in which case the seal needs only to impede oxygen diffusion toward the hot pipe ends; and/or ii) to contain liquid quench media in applications that involve marquenching as the preferred IHT process in which case the seal should be watertight at low pressure, e.g. 100 kPa. An annular induction coil 110 is spaced between the purge baffles 108.

Another function of the internal MFT 100 is to provide low frequency induction heating from the ID of the pipe as would be recommended for heavy wall pipes. This capability would be mainly for the largest diameters, typically those of 300 mm or greater. To keep the induction heating centered on the weld with minimized heating of the parent metal, the ID induction coil would be centered on the weld, coinciding with the minor diameter of the half-toroid purge volume described above. In order to achieve best possible electrical efficiency, the D-shaped cross section of the half toroid would be flattened to produce a tall slender "D" so that the induction coil is as close as possible to the weld ID. Also, the coupling of the magnetic field into the pipe is maximized with "U" shaped flux concentrating material lining the minor diameter of the toroid and extending nearly into contact with the ID's of the pipes. It is understood that this low frequency induction coil 110 may either be integrated into the quench containment section described above, or it can be physically separate in an elongated tool equipped with a linear actuator to quickly slide either functioning section of the tool into center position with respect to the IKW weld. Since the preferred embodiment of the improved IKW welding chamber utilizes C-shaped half coils, this ID tool can be designed to actuate at any time during the IKW process without risk of collision.

The design principles in the preceding non-limiting embodiment can similarly be applied to other weld geometries with appropriate changes to the physical components, to enable the range of IHT and/or TMCP processing of welds. For example, applications involving highly quench hardening materials in welded structures which have significant asymmetry such as a varied wall thickness would be good candidates for marquenching to prevent cracking which might otherwise occur with conventional post weld quenching and tempering. Likewise, the chemistry of materials being welded can be modified to more optimally respond to the desired IHT or TMCP process. For example, while elevated boron levels in the alloy make it practical to austemper thicker walled pipe, other elements known to those skilled in metallurgy can reduce the time required for austempering process to produce the lower bainite microstructure. In pipeline offshore welding applications for example, it would not be practical to use an austempering process which requires an hour to reach $t_6$ on FIG. 6. Instead, alloying of the material would be optimized to reduce the $t_6$ time to 10 minutes or less.

While the non-limiting embodiments are described in applications involving high strength hypoeutectoid steels, it is to be understood that the same design and process principles can be applied to other base metals and alloys, provided they respond to heat treatments, for example certain titanium alloys, nickel based alloys, etc.

In use, advantages and features of the invention as disclosed in various non-limiting embodiments include:

a) Integrated TMCP is ideally suited for autogenous, one-shot processes which use global parameters for the entire weld.

b) Internal bridge plug tool to provide: a) gas shielding dam, b) ID quenching, c) ID induction heating TMCP induction coil.

c) Selective control of specific alloying elements like boron to enhance compatibility of the steel to austempering.

d) External secondary 2-piece TMCP induction coil to come around weld immediately after the primary heating coil clears from between the pipe ends so that the secondary coil can provide heating during the kinetic phase resulting in TMCP.

e) Secondary coils designed to operate at frequency inversely proportional to the wall thickness. Heavy wall pipe of 1" to 2" wall thickness should be TMCP induction heated as low as 60 Hz.

f) For optimal productivity, the TMCP cycle should ideally be achieved within 5 minutes. Up to 10 minute cycle times may be justified on some applications.

g) Increases process robustness and broadens parameter range capable of achieving successful welds.

h) Anisotropic properties of pipe through TMCP maximize the longitudinal properties (transverse are lower) but this is lost in solid state butt welds.

i) IKW is probably the only solid state process which provides window of opportunity for integrated TMCP instantly after the weld has been executed due to satisfaction of following prerequisites; a) one-shot process, b) high speed weld, less than 2 seconds, c) no flash or buckhorns to interfere with TMCP.

j) Process allows broad control of what would normally be discrete TMCP parameters.

k) Process allows fine control of temperature and duration for what would normally be subsequent separate TMCP cycle.

l) Process is applicable to any heat treatable material, for example 13 Chrome steel, various Titanium alloys, Nickel based alloys, etc.

m) The effective induction coil may be comprised of more than two half circular "C" shaped sections, for example three semicircular segments of 120 degrees.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

Figure 9A:
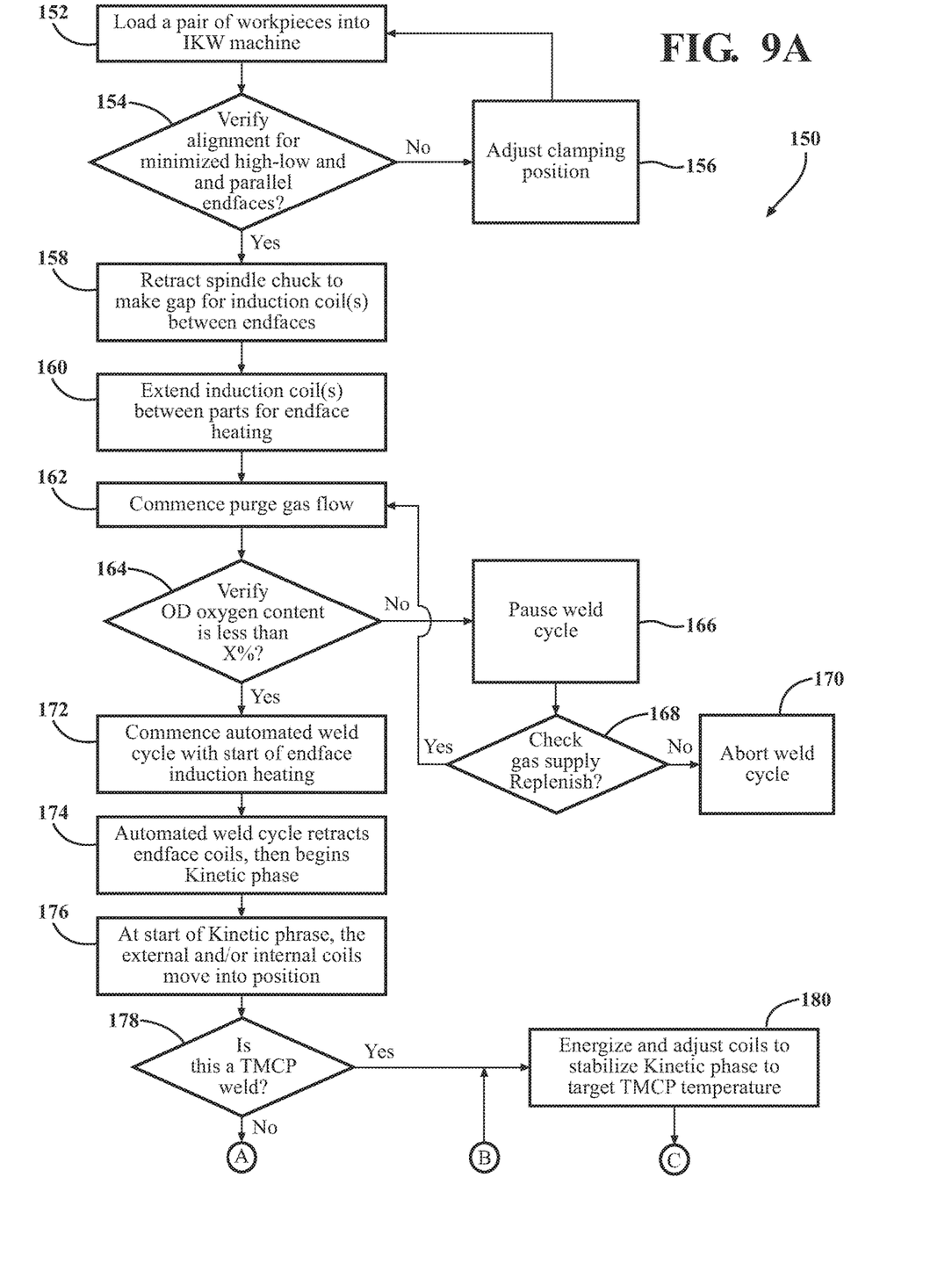
FIG. 9A is a flowchart of a non-limiting embodiment of the method of the invention.
Figure 9B:
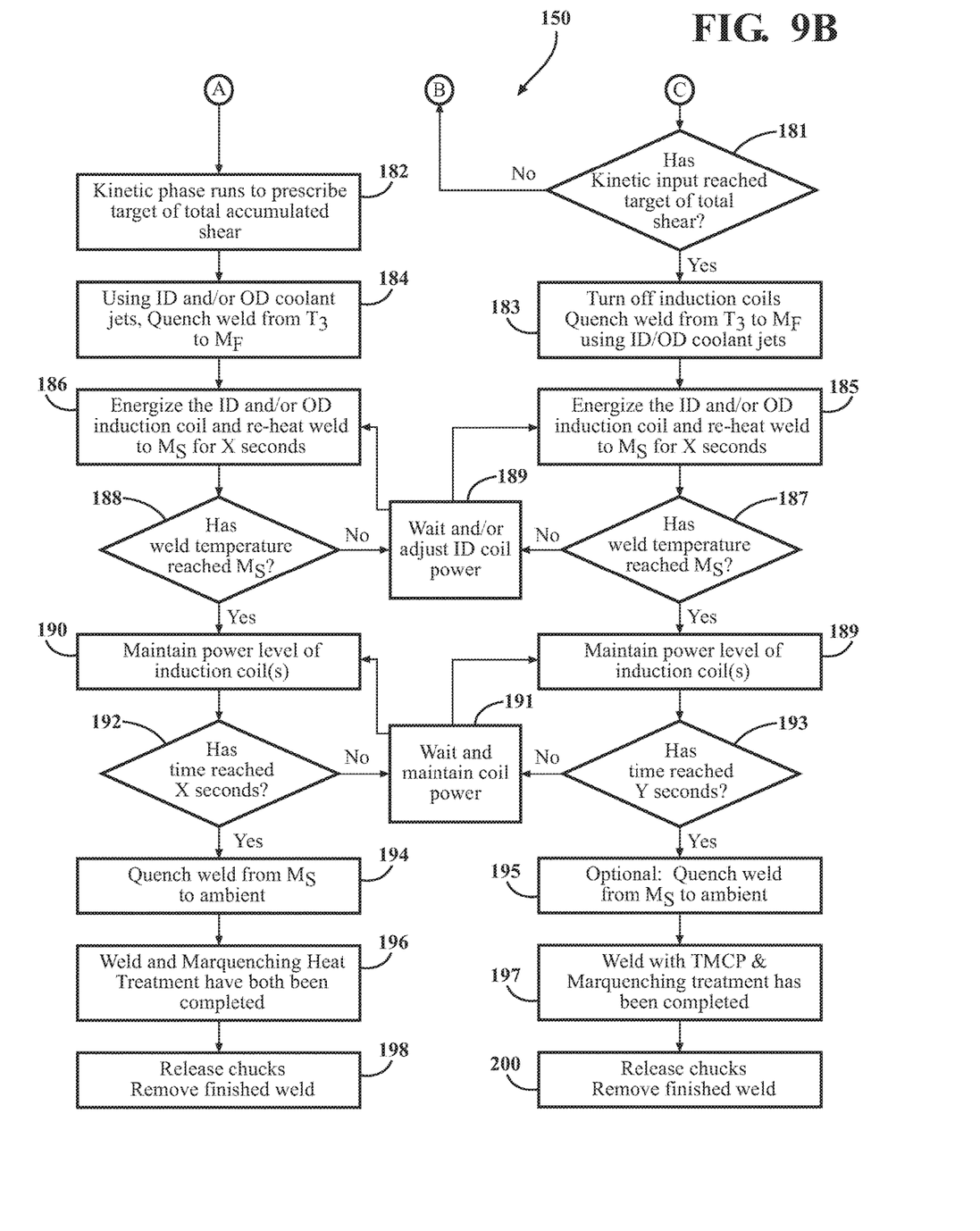
FIG. 9B is a flowchart of a non-limiting embodiment of the method of the invention.

FIGS. 9A and 9B provide a generalized flowchart for the most complex variations of a non-limiting embodiment of the method of the present invention 150, although simpler variations will often prove to be the most commercially desirable, provided they can deliver the required performance in the given application. The IKW process and its variations all begin with securely clamping the mating workpieces in good alignment with each other 152. Various instruments and methods are available to verify whether the mating workpieces are correctly aligned in their clamped position 154, for example laser micrometers, machine vision cameras, mechanical hard stops, mechanical feelers, etc. Often this is done with the weldfaces touching each other, so once correct alignment is verified, it is necessary to retract one of the chucks to make room for the IKW induction coil to fit in between the opposing weldfaces with the prescribed clearance, typically one-tenth of an inch or less on each side of the coil. This moment is the latest point at which the purge gas flow 162 should be started but in some IKW machine designs it is practical to commence purge gas flow earlier to reduce the weld cycle time. The induction heating must not start until it has been confirmed that the purge gas has displaced all oxygen from the vicinity of the weldfaces 164 because at the temperatures involved in the IKW process, there would be immediate oxidation of the hot weldfaces and this will prevent the IKW process from succeeding. If the measured oxygen level is higher than desirable, for example 100 ppm, then there are generally two choices; a) either prolong the purge cycle and monitor to see if the oxygen level continues to fall, or b) abort the weld cycle and look for causes such as depleted gas supply, torn purge flaps, etc. Once the required oxygen level has been confirmed, the induction heating of the weldfaces can begin 172. After this trigger point, the IKW process is always fully automated because everything happens very quickly. When the weldfaces have reached the prescribed temperature for the given material, typically after about 10 seconds of heating, the automated control system will retract the induction coil(s) from between the weldfaces 174 so that the hot weldfaces can be brought into contact with each other. This denotes the beginning of the Kinetic phase of the IKW process 176 and according to what the control system has been programmed for 178, the subsequent steps will proceed under either 180 or 182.

TMCP sequence 180 begins with the external and/or internal induction coils being energized and regulated to power levels so as to maintain the prescribed temperature profile which may be constant or variable, in conjunction with the kinetic input to the IKW machine. The exact temperature profile and kinetic rates involved are designed to maximize specified properties of the exact alloy composition being welded and are understood by those skilled in the related arts and sciences of metallurgy, welding, pipe manufacturing, etc. Once the prescribed TMCP sequence has been completed 181 the Kinetic input stops and the induction coils are turned off. For Marquenching as the finishing heat treatment, it will be preferable to quench the weld 183 with either gas or liquid, by means of coolant jets built into the MFT and/or the external induction coil assembly. This will quickly bring the entire weld zone down below the Martensite finish temperature (80). Immediately after this, the weld is reheated 185 by the internal and/or external induction coils 187 back above the Martensite start temperature (82) for a prescribed duration ranging from a few seconds to several minutes or more (189, 193). Then the weld is quenched 195 for the final time, to below the Martensite finish temperature (80) and in certain cases, all the way down to ambient temperature where for example inspecting or handling a hot weld is undesirable.

Alternatively, if no kinetic effects are needed to form the desired microstructure in the just completed IKW weld 182, yet where the alloy composition being welded is able to be quench hardened, then a typically desirable finishing heat treatment would be Austempering or Marquenching. For consistency with the foregoing TMCP description, the flowchart shows how the IKW process would be integrated with Marquenching immediately following the standard IKW Kinetic phase. Quenching of the still hot weld 184 with either gas or liquid, is again performed by means of coolant jets built into the MFT and/or the external induction coil assembly. This will quickly bring the entire weld zone down below the Martensite finish temperature (80). Immediately after this, the weld is reheated 186 by the internal and/or external induction coils 188 back above the Martensite start temperature (82) for a prescribed duration ranging from a few seconds to several minutes or more (190, 192). Then the weld is quenched 194 for the final time, to below the Martensite finish temperature (80) and in certain cases, all the way down to ambient temperature where for example inspecting or handling a hot weld is undesirable.

What is claimed is:

1. A method of sold-state induction-kinetic welding pipes end to end with integration of an integrated heat treatment processing of the weld, said method comprising:
    heating endfaces of at least two metal pipes with an induction heating coil;
    forcing the endfaces of the at least two pipes together and rotating them in a kinetic energy welding process wherein the ends of the at least two pipes are welded together;
    allowing the temperature of the weld to decrease; and
    maintaining the weld at a threshold temperature until transformation of the metastable austenite into lower bainite is at least substantially complete.

2. The method of claim 1, further comprising:
    quenching the weld.

3. The method of claim 1, further comprising:
    cooling the weld.

4. The method of claim 1, wherein the induction heating coil comprises a first and second C-shaped portions.

5. The method of claim 3, wherein said first and second C-shaped portions meet between the endfaces of the at least two pipes wherein the first and second C-shaped portions form the induction heating coil.

6. The method of claim 1, wherein, the maintaining the weld at a threshold temperature is maintained with a second induction heating coil.

7. The method of claim 6, wherein the second induction heating coil comprises a third and fourth C-shaped portions.

8. The method of claim 7, wherein said third and fourth C-shaped portions meet around the weld to form the second induction heating coil.

9. A method of sold-state induction-kinetic welding pipes end to end with integration of an integrated heat treatment processing of the weld, said method comprising:
    heating endfaces of at least two metal pipes with a first induction heating coil;
    forcing the endfaces of the at least two pipes together and rotating them in a kinetic energy welding process wherein the ends of the at least two pipes are welded together;
    allowing the temperature of the weld to decrease;
    maintaining the weld at a threshold temperature until transformation of the metastable austenite into lower bainite is at least substantially complete, wherein the temperature is maintained at least in part with a second induction heating coil, wherein the second induction heating coil is inserted into the at least two pipes and held in proximity to the weld.

10. The method of claim 9, further comprising:
    quenching the weld.

11. The method of claim 9, further comprising:
    a third induction heating coil.

12. The method of claim 11, wherein the temperature is maintained with the second and third induction heating coil.

13. The method of claim 9, wherein the first induction heating coil comprises a first and second C-shaped portions.

14. The method of claim 13, wherein said first and second C-shaped portions meet between the endfaces of the at least two pipes wherein the first and second C-shaped portions form the first induction heating coil.

15. The method of claim 11, wherein the third induction heating coil comprises a third and fourth C-shaped portion, wherein the third and fourth C-shaped portions meet to form the third induction heating coil around the weld.

16. The method of claim 9, wherein the second induction heating coil is disposed in a multifunction tool.

17. The method of claim 9, wherein the second induction heating coil is disposed in a multifunction tool, wherein the multifunction tool comprises seals for sealing the multifunction tool onto the inside walls of the innermost of the at least two pipes, wherein a closed environment is created within the at least two pipes.

18. The method of claim 17, wherein the multifunction tool further comprises a quenching inlet and outlet for allowing the flow of a quenching fluid into the sealed off portion of the at least two pipes.

19. An apparatus for sold-state induction-kinetic welding pipes end to end with integration of an integrated heat treatment processing of the weld, said apparatus comprising:
    a first induction heating coil comprising two C-shaped members that when moved together form a first induction heating circuit, wherein the first induction heating coil has an inside diameter substantially equal to the insider diameter of the two pipes to be welded, wherein the C-shaped members are adapted to be actuated together between the two pipes to be welded;
    a multifunction tool comprising a second induction heating coil, wherein the multifunction tool is adapted to be inserted into the two pipes to be welded and located in proximity to the weld site, wherein the multifunction tool further comprises a first and second seal portions that are adapted to seal off the inside of the two pipes to be welded in proximity to the weld and allow for inserting and evacuating gases or fluids into sealed off portion of the two pipes, wherein the multifunction tool further comprises gripping members for gripping the inside of the two pipes to be welded and hold them in centering position for the welding process;
    wherein the first induction heating coil and the second induction heating coil can be cooperatively used to perform an induction-kinetic weld of the two pipes and then maintain the weld at a threshold temperature until transformation of the metastable austenite into lower bainite is at least substantially complete.

20. The apparatus of claim 19, further comprising:
    a third induction heating coil, wherein the third induction heating coil comprises first and second C-shaped portions that together form the third induction heating circuit, wherein the third induction heating coil is adapted to close around the welded pipes and control the temperature for an integrated heat treatment processing of the weld.

\* \* \* \* \*